(12) United States Patent
Arao

(10) Patent No.: US 11,050,360 B2
(45) Date of Patent: Jun. 29, 2021

(54) POWER CONVERSION DEVICE

(71) Applicant: Hitachi Industrial Equipment Systems Co., Ltd., Tokyo (JP)

(72) Inventor: Yusuke Arao, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 0 days.

(21) Appl. No.: 16/640,828

(22) PCT Filed: Sep. 6, 2017

(86) PCT No.: PCT/JP2017/032163
§ 371 (c)(1),
(2) Date: Feb. 21, 2020

(87) PCT Pub. No.: WO2019/049246
PCT Pub. Date: Mar. 14, 2019

(65) Prior Publication Data
US 2020/0220480 A1 Jul. 9, 2020

(51) Int. Cl.
*H02M 5/458* (2006.01)
*H02M 5/453* (2006.01)
(Continued)

(52) U.S. Cl.
CPC ...... *H02M 7/53871* (2013.01); *H02H 1/0007* (2013.01); *H02H 7/1216* (2013.01);
(Continued)

(58) Field of Classification Search
CPC ........... H02M 1/425; H02M 2001/327; H02M 5/453; H02M 5/458
(Continued)

(56) References Cited

U.S. PATENT DOCUMENTS

2015/0023075 A1* 1/2015 Kim ............... H02H 7/122
363/56.03
2015/0130380 A1* 5/2015 Kato ............... H02P 27/085
318/400.21
(Continued)

FOREIGN PATENT DOCUMENTS

JP 59-106882 A 6/1984
JP 4-145893 A 5/1992
(Continued)

OTHER PUBLICATIONS

Japanese-language International Search Report (PCT/ISA/210) issued in PCT Application No. PCT/JP2017/032163 dated Nov. 28, 2017 with English translation (four pages).
(Continued)

*Primary Examiner* — Gary A Nash
(74) *Attorney, Agent, or Firm* — Crowell & Moring LLP

(57) ABSTRACT

Disclosed is a power conversion device having an AC conversion unit and a control unit that controls the AC conversion unit. The power conversion device also has: a temperature detection unit that outputs temperature data of the power conversion device; a current detection unit that outputs current data of an output of the AC conversion unit; a storage unit that stores specification data indicating a relationship between a rated current and a temperature specification and temperature data output by the detection unit; an overload protection unit that outputs a shutdown command to the control unit on the basis of the rated current and the current data output by the current detection unit; and a rating determination unit that acquires specification data and temperature data from the storage unit, determines a
(Continued)

rated current corresponding to the acquired temperature data on the basis of the acquired specification data, and outputs the determined rated current to the overload protection unit.

10 Claims, 4 Drawing Sheets

(51) Int. Cl.
    *H02M 7/5387* (2007.01)
    *H02H 1/00* (2006.01)
    *H02H 7/12* (2006.01)
    *H02M 1/00* (2006.01)
    *H02P 27/08* (2006.01)
    *H02M 1/32* (2007.01)

(52) U.S. Cl.
    CPC ........... *H02M 1/00* (2013.01); *H02M 5/4585* (2013.01); *H02P 27/08* (2013.01); *H02M 5/453* (2013.01); *H02M 5/458* (2013.01); *H02M 2001/0009* (2013.01); *H02M 2001/327* (2013.01)

(58) Field of Classification Search
    USPC .......................................... 363/35, 37, 56.01
    See application file for complete search history.

(56) References Cited

U.S. PATENT DOCUMENTS

| | | | |
|---|---|---|---|
| 2015/0295514 A1* | 10/2015 | Yamagami | B60L 58/24 363/98 |
| 2015/0311800 A1* | 10/2015 | Katayama | H02M 7/487 323/235 |
| 2016/0039307 A1 | 2/2016 | Okamura | |

FOREIGN PATENT DOCUMENTS

| | | |
|---|---|---|
| JP | 11-32482 A | 2/1999 |
| JP | 11-308761 A | 11/1999 |
| JP | 2008-16393 A | 1/2008 |
| JP | 2013-123340 A | 6/2013 |
| JP | 2014-187756 A | 10/2014 |

OTHER PUBLICATIONS

Japanese-language Written Opinion (PCT/ISA/237) issued in PCT Application No. PCT/JP2017/032163 dated Nov. 28, 2017 with English translation (six pages).

* cited by examiner

POWER CONVERSION DEVICE

TECHNICAL FIELD

The present invention relates to a power conversion device.

BACKGROUND ART

As a background art in this technical field, there is Patent Document 1. Patent Document 1 discloses that "set in the control circuit 25, the rated value of the primary current of the AC motor 3 from the display circuit 24, the current value obtained by multiplying the rated value by a predetermined value, and the operation continuation possible time at this current value are set, and the inverter 2 operates while monitoring the effective value of the primary current of the AC motor 3 which is an output of the current calculator 23 on the basis of the anti-time time limit characteristics derived from these set values" (refer to Summary).

CITATION LIST

Patent Document

Patent Document 1: JP 11-308761 A

SUMMARY OF THE INVENTION

Problems to be Solved by the Invention

If the technique described in Patent Document 1 is used, it is possible to protect the AC motor from overload. However, the technique described in Patent Document 1 necessarily requires connecting an AC motor having a rated current lower than the rated current of the inverter. On the contrary, the connected AC motor does not necessarily have a rated current equal to or less than that of the inverter.

For example, an AC motor compatible with an IE3 with higher efficiency tends to have a higher rated current than an AC motor compatible with an IE1 in the related art. For this reason, there is a problem that replacement of the AC motor for higher efficiency protects overload, and the AC motor may be likely to stop.

Therefore, an object of the present invention is to expand a range of the AC motor that can be connected to a power conversion device (inverter).

Solutions to Problems

In order to solve the above problem, for example, a configuration described in the claims is adopted.

The present invention includes a plurality of means for solving the above-described problems, and as an example, a power conversion device having an AC conversion unit and a control unit that controls the AC conversion unit includes: a temperature detection unit that outputs temperature data of the power conversion device; a current detection unit that outputs current data of an output of the AC conversion unit; a storage unit that stores specification data indicating a relationship between a rated current and a temperature specification and temperature data output by the detection unit; an overload protection unit that outputs a shutdown command to the control unit on the basis of the rated current and the current data output by the current detection unit; and a rating determination unit that acquires specification data and temperature data from the storage unit, determines a rated current corresponding to the acquired temperature data on the basis of the acquired specification data, and outputs the determined rated current to the overload protection unit.

Effects of the Invention

According to this invention, it is possible to expand a range of the AC motor that can be connected to a power conversion device. In addition, problems, configurations, and effects other than those described above will be clarified by the following description of the embodiments.

MODE FOR CARRYING OUT THE INVENTION

Hereinafter, preferred embodiments of the present invention will be described with reference to the drawings.

First Embodiment

In the present embodiment, an operation example will be described in which, in a case where a user determines temperature specification, a power conversion device (inverter) changes a rated current and expands a drive operation range in the current.

Figure 1:
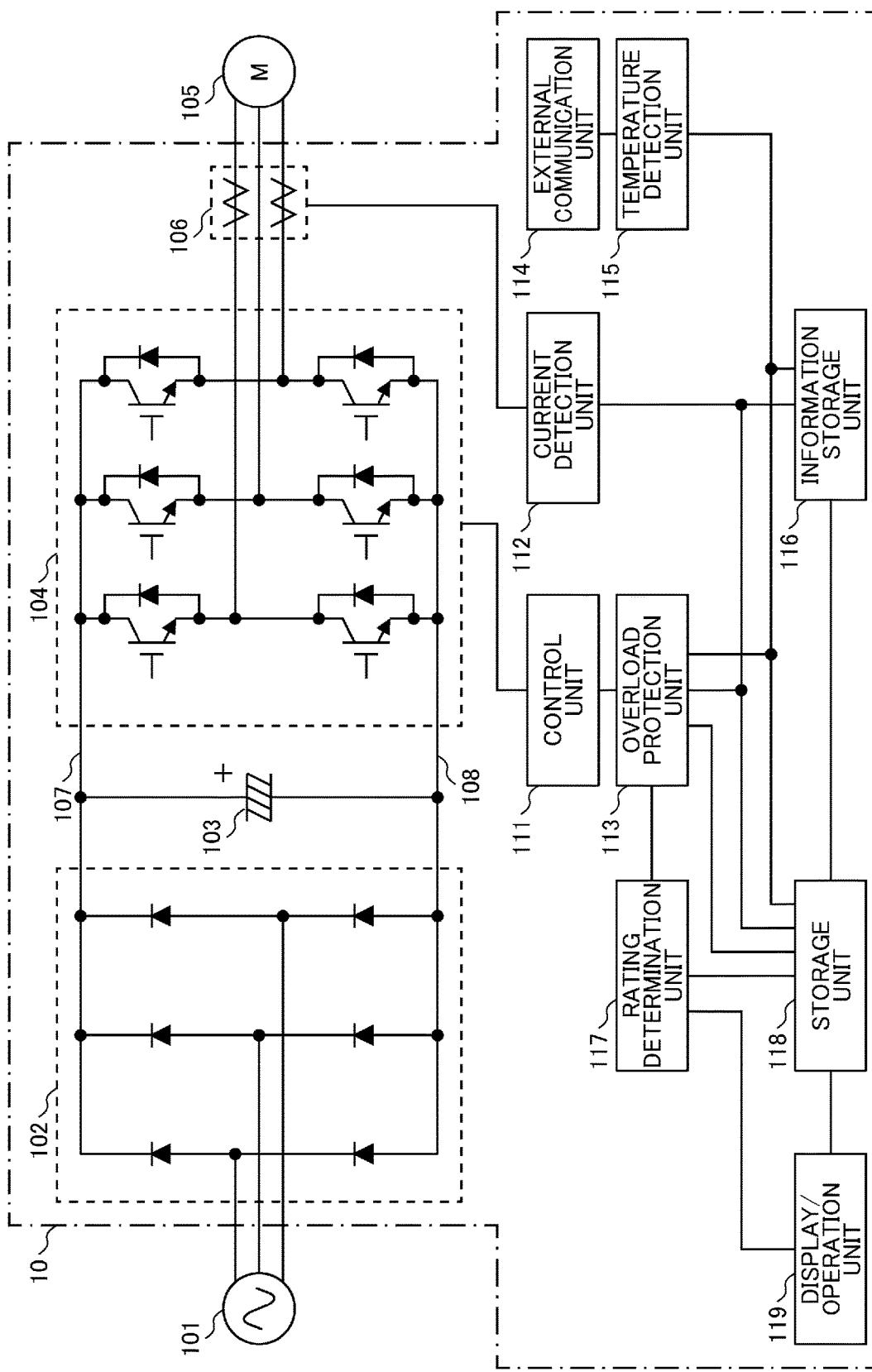
FIG. 1 is a diagram illustrating an example of a configuration of a power conversion device.

FIG. 1 is a diagram illustrating an example of a configuration of a power conversion device 10. In the example of FIG. 1, the power conversion device 10 is connected to a three-phase AC power supply 101 and an AC motor 105, and includes a DC conversion unit 102, a smoothing capacitor 103, an AC conversion unit 104, a current detector 106, a control unit 111, a current detection unit 112, an overload protection unit 113, an external communication unit 114, a temperature detection unit 115, an information storage unit 116, a rating determination unit 117, a storage unit 118, and a display/operation unit 119.

The three-phase AC power supply 101 is, for example, a three-phase AC voltage supplied from a power company or an AC voltage supplied from a generator and outputs these AC voltages to the DC conversion unit 102.

The DC conversion unit 102 is configured with, for example, a DC conversion circuit including a diode or a DC conversion circuit using an insulated gate bipolar transistor (IGBT) and a flywheel diode and converts an AC voltage input from the three-phase AC power supply 101 into a DC voltage and outputs the DC voltage to the smoothing capacitor 103. FIG. 1 illustrates the DC conversion unit 102 including a diode as an example.

The smoothing capacitor 103 smooths the DC voltage input from the DC conversion unit 102 and outputs the DC voltage to the AC conversion unit 104. For example, in a case where a generator is connected instead of the three-phase AC power supply 101 and the output of the generator is a DC voltage, the smoothing capacitor 103 may be directly input with the DC voltage from the generator without passing through the DC conversion unit 102.

The AC conversion unit 104 is configured with an AC conversion circuit using, for example, an IGBT and a flywheel diode, and the AC conversion unit 104 is input with a DC voltage of the smoothing capacitor 103 and an output command of the control unit 111, converts the DC voltage into an AC voltage, and outputs the AC voltage to the AC motor 105.

In addition, in a case where the AC conversion unit 104 is configured with an AC conversion circuit that performs AC-AC conversion without passing through the DC conversion unit 102 and the smoothing capacitor 103, the AC conversion unit 104 may convert an AC voltage into an AC voltage and output the AC voltage to the AC motor 105.

The current detector 106 is configured with, for example, a Hall current transformer (CT) or a shunt resistor and is arranged at an output portion of the power conversion device 10 to detect a current flowing in the AC motor 105 and output the current to the current detection unit 112 as a current detection value.

If the current detector 106 is arranged at a place where the output current flowing in the AC conversion unit 104 can be estimated or directly detected, for example, the current detector 106 may be arranged before or after an element or at a place such as an upper portion 107 or a lower portion 108 of a DC unit. FIG. 1 illustrates an example in which a current flowing through the AC motor 105 is detected.

The control unit 111 provides a pulse width modulation (PWM) output command to the AC conversion unit 104 in accordance with an output command calculated from a command given to drive the AC motor 105.

The current detection unit 112 converts the current detection value input from, for example, the current detector 106 into internal data (current data), for example, with the maximum value of the rated current being set to 100% and outputs the internal data to the overload protection unit 113 and the information storage unit 116. In addition, the current detection unit 112 may output the internal data to the storage unit 118 and accumulate the interval data.

The overload protection unit 113 is input with the current data converted by the current detection unit 112 and the temperature data detected by the temperature detection unit 115 and calculates an overload withstand capacity stored in the storage unit 118, a current amount corresponding to the rated current input from the rating determination unit 117, and a time during which the current amount can flow. When the current amount exceeds the calculated time, it is determined that the overload withstand capacity has been exceeded, and a shutdown command is output to the control unit 111.

The external communication unit 114 may be connected to, for example, a local area network (LAN) or a wide area network (WAN) by wired communication or wireless communication to acquire information on the indoor temperature installed of the power conversion device 10 detected by an external device via the LAN or to acquire external information such as weather forecast via the WAN and output the acquired temperature information to the temperature detection unit 115.

The temperature detection unit 115 converts the temperature information input from the external communication unit 114 into temperature data in units of, for example, 0.1° C. and outputs the temperature data to the overload protection unit 113 and the information storage unit 116. In addition, the temperature detection unit 115 may output the temperature data to the storage unit 118 to accumulate the temperature data.

The information storage unit 116 stores ambient temperature data or output current data input from the current detection unit 112 and the temperature detection unit 115 in the storage unit. Time information may be stored together with the data so that the relationship between the data and the time can be associated later.

In addition, when the information storage unit 116 determines that the ambient temperature data or the output current data input from the current detection unit 112, the temperature detection unit 115, and the storage unit 118 is lower than the temperature specification or the rated current input from the storage unit 118 for a predetermined period, the information storage unit 116 may change the rated current or the temperature specification and output the changed rated current or the changed temperature specification to the storage unit 118.

The rating determination unit 117 determines the rated current specification of the power conversion device 10 from the temperature setting value or the temperature specification of the power conversion device 10 from the rated current setting value within a predetermined temperature specification range according to the relationship between the current and the temperature stored in the storage unit 118 and outputs an overload protection level (rated current) to the overload protection unit 113.

The storage unit 118 is configured with an element for temporarily storing data, for example, a random access memory (RAM) or the like or an electrically erasable programmable read only memory (EEPROM) or a data flash ROM that retains the memorized contents even when the power is shut off and may store the operation procedure of the overload protection unit 113 and the rating determination unit 117.

The storage unit 118 stores in advance set values or calculation formulas of the overload withstand capacity unique to the power conversion device 10 representing the relationship between the temperature specification and the rated current specification unique to the power conversion device 10 and the relationship with the time during which the current amount corresponding to the rated current can flow and the overload withstand capacity corresponding to each of the plurality of temperatures and stores the temperature specification set values or the rated current set values input from the display/operation unit 119.

In addition, the storage unit 118 may be input with current data or temperature data from the current detection unit 112, the temperature detection unit 115, or the information storage unit 116 and store the data together with the time of the data.

The display/operation unit 119 is, for example, a user interface such as an operation panel or an input/output terminal, a smartphone, a smart watch, a tablet terminal, or a personal computer and outputs, for example, information operated by a user or data obtained from an external device to the storage unit 118. The display/operation unit 119 may be an input unit for data from an external device or the like in order to obtain data from the external device or the like.

In particular, the display/operation unit 119 outputs the data of the rated current specification or the temperature specification set by the user to the storage unit 118. In addition, the display/operation unit 119 is input with the rated current specification or the temperature specification stored in the storage unit 118 and displays a currently set value to the user. In addition, the display/operation unit 119 may be outside the power conversion device 10 or may be a communication unit for connecting to another terminal or the like.

Figure 2A:
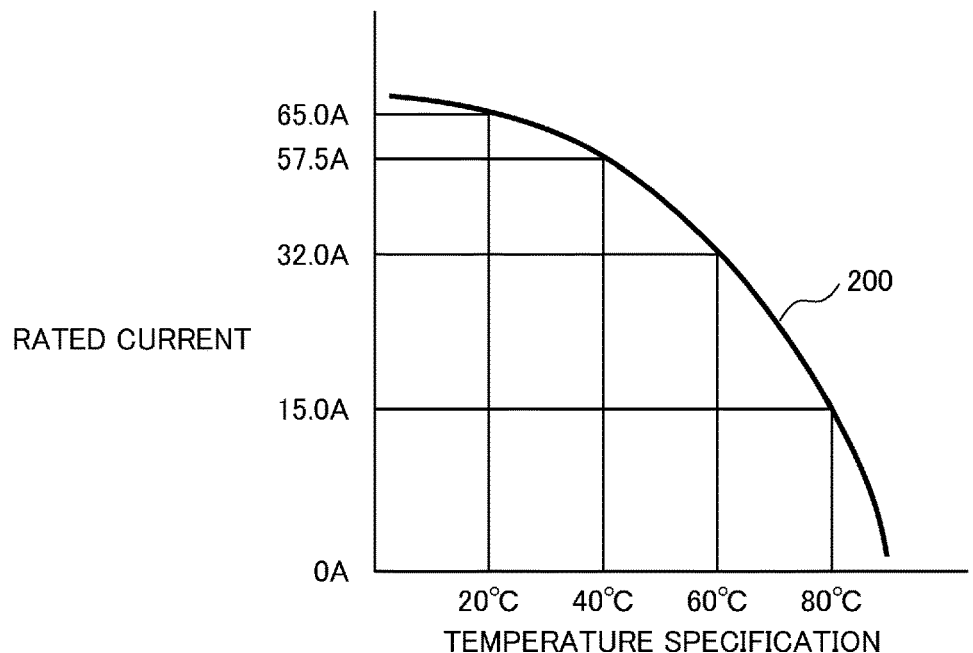
FIG. 2A is a diagram illustrating an example of data defining a relationship between a rated current and a temperature specification.

FIG. 2A is a diagram illustrating an example of data defining the relationship between the rated current and the temperature specification unique to the power conversion device 10 stored in the storage unit 118. Herein, the term "unique to the power conversion device 10" may denote unique to the model of the power conversion device 10 or may denote unique to the manufacturing lot of the power conversion device 10.

The temperature specification is a specification range of an element (or component) of which the temperature specification is defined, for example, a diode constituting the DC conversion unit 102, a smoothing capacitor 103, an IGBT constituting the AC conversion unit 104, a current detector 106, or an MCU (not illustrated) constituting the power conversion device 10, a thyristor, a capacitor, a logic element, or the like.

From the specification range of the temperature and the results of the temperature rise test and the like of the power conversion device 10, the relationship between each temperature and the rated current which is a current value that can be continuously output as the power conversion device 10 is illustrated as a curve 201. The range where the current or the temperature is higher than the curve 201 indicates a state to be protected.

In addition, the relationship between each temperature and the rated current may be, for example, a curve that continuously increases and decreases the temperature specification range and the carrier output control range according to the heat generation curve of a module (or an element), a power supply circuit, or a module unit that generates a large amount of heat. The relationship between each temperature and the rated current may be set on the basis of the element having the lowest rated current and temperature specification among the elements constituting the power conversion device 10.

Figure 2B:
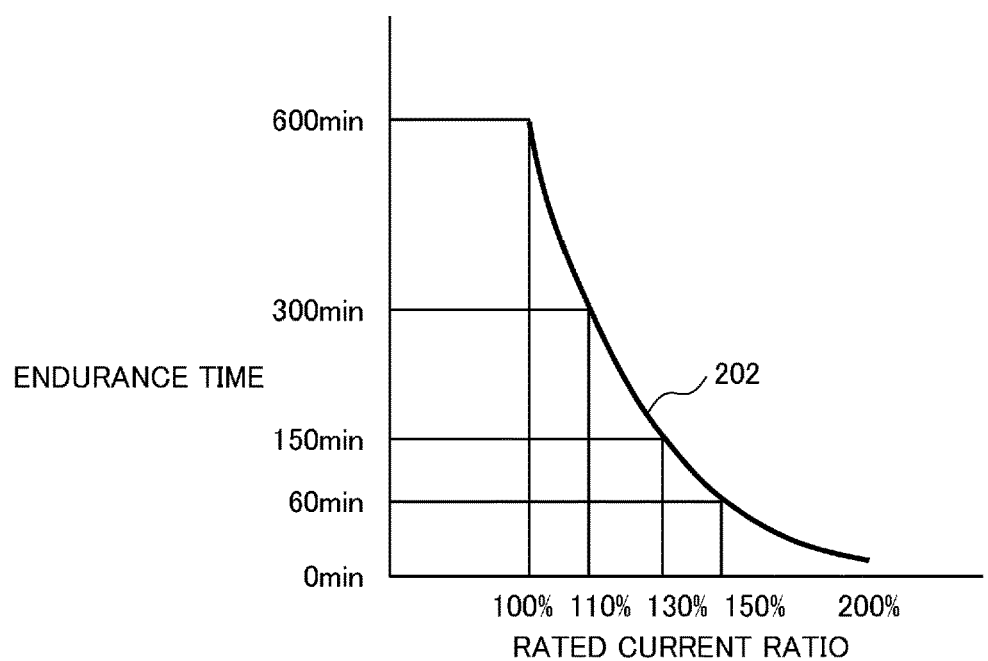
FIG. 2B is a diagram illustrating an example of data defining a relationship between a rated current ratio and a durable time.

FIG. 2B is a diagram illustrating an example of data defining the relationship between the rated current ratio unique to the power conversion device 10 and the endurance time stored in the storage unit 118.

In a case where the current exceeds the rated current from the temperature specification range of the target component in FIG. 2A and the results of the temperature rise test or the like of the power conversion device, the relationship between the rated current ratio and the endurance time for the protection is illustrated by a curve 202.

The curve 202 indicates that, as the current becomes higher than the curve 201 of the rated current illustrated in FIG. 2A, that is, as the rated current ratio becomes higher, the endurance time becomes shorter. 100% of the rated current ratio is curve 201, and the endurance time that does not require protection is infinite.

In a case where the current flowing in the current detector 106 is a current which exceeds the rated current and needs to be protected according to the data of the rated current ratio of the curve 202 illustrated in FIG. 2B on the basis of the rated current set by the rating determination unit 117 based on the data of the curve 201 illustrated in FIG. 2A, after an elapse of the durable time corresponding to the rated current ratio, the overload protection unit 113 outputs a PWM output shutdown command to the control unit 111.

In the power conversion device in the related art, in a case where the rated current of the AC motor is lower than the rated current of the power conversion device, that is, when there is a margin in the rated current of the power conversion device, overload protection is performed in accordance with the rated current of the AC motor.

On the contrary, in the present embodiment, even in a case where the rated current of the AC motor is higher than the rated current of the power conversion device, the temperature condition is determined for a portion which has been protected by overlooking the margin in the related art, and the movable range of the AC motor can be widened beyond the rated current of the power conversion device.

Figure 3:
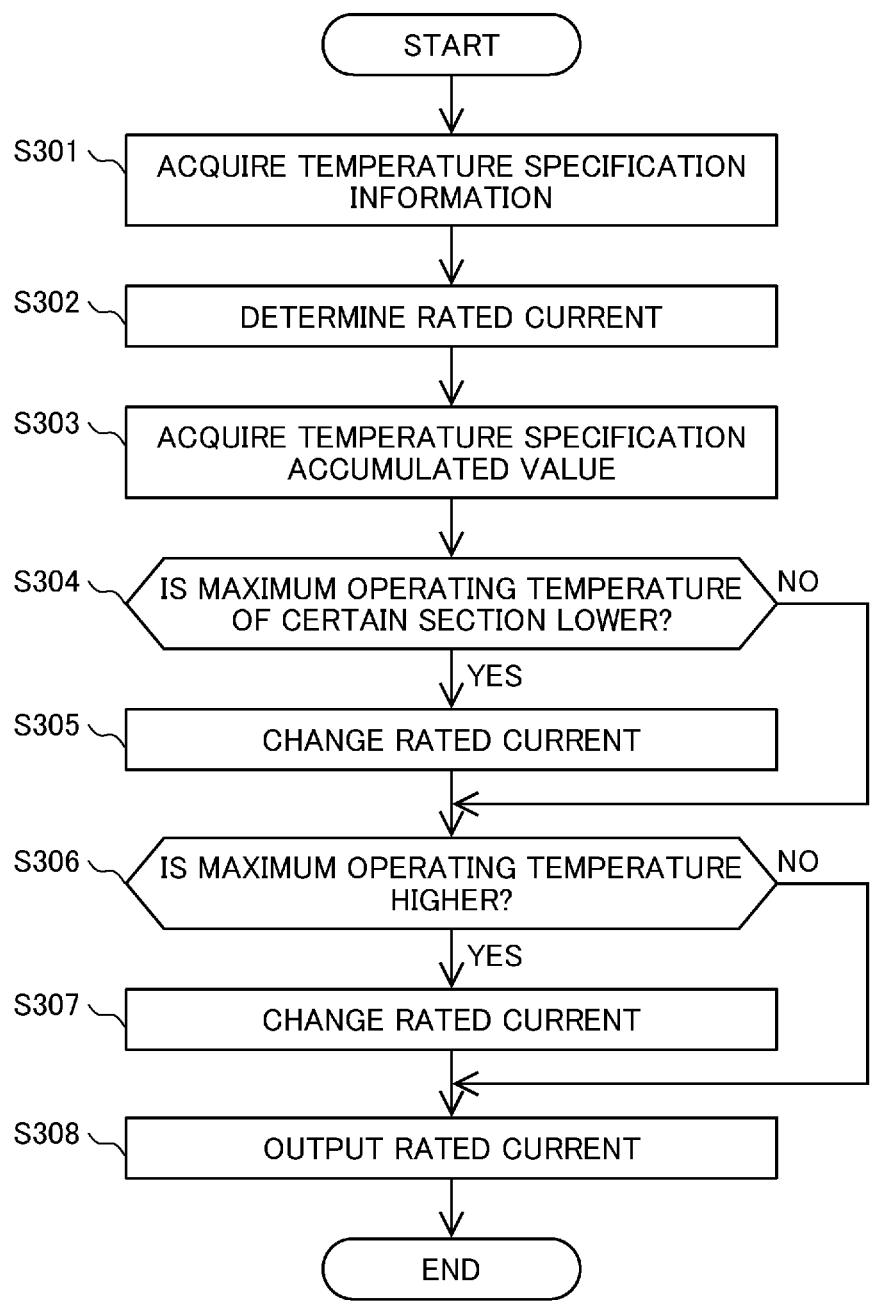
FIG. 3 is a diagram illustrating an example of a flow of a rating determination unit according to a first embodiment.

FIG. 3 is a diagram illustrating an example of a flow in which the rating determination unit 117 determines the rated current from the temperature specification. First, the rating determination unit 117 reads out temperature specification information from the storage unit 118 (step S301). For example, the rating determination unit 117 may selectively perform whether to acquire a specification value set in advance in the storage unit 118 by the user through the display/operation unit 119 as the temperature specification information, or whether to acquire a representative value determined in advance at the time of production if the user does not set the specification value.

For example, in a case where the temperature specification value set in advance is "60° C." in conformity with the data of the curve 201 illustrated in FIG. 2A, the rating determination unit 117 sets the rated current to "32.0 A" or more and outputs the rated current to the overload protection unit 113 (step S302).

The rating determination unit 117 acquires the temperature specification accumulated value information from the storage unit 118 (step S303), the acquired temperature specification accumulated value information is set in advance to, for example, 60 seconds as a certain section, and the rating determination unit 117 determines whether the maximum operating temperature of the certain section is lower than the "60° C." set in advance (step S304).

In a case where the rating determination unit 117 determines that the maximum operating temperature in the certain section is low, if the maximum operating temperature is, for example, 40° C., the rated current that allows continuous operation is changed to "57.5 A" corresponding to "40° C." in the curve 201 to increase the protection start current (step S305).

In addition, the overload protection unit 113 is operating at a rated current of, for example, 57.5 A corresponding to 40° C., and the rating determination unit 117 determines whether the maximum operating temperature of the temperature specification accumulated value information acquired in step S303 is higher than 40° C. (step S306).

In a case where the rating determination unit 117 determines that the maximum operating temperature is high, if the maximum operating temperature has risen to, for example, 60° C., the rated current that allows continuous operation is decreased down to "32.0 A" corresponding to "60° C." in the curve 201 (step S307).

The change of the rated current is not limited to a good value for the break, but the rated current may be changed continuously if the rated current conforms to the curve 201 illustrated in FIG. 2A. The rating determination unit 117 outputs the data of the changed rated current to the storage unit 118 as information to be displayed (S308).

As described above, even if the current of the AC motor 105 becomes large, in a case where the maximum operating temperature is low, the setting of the rated current of the power conversion device 10 is increased, so that a drive region can be secured. In addition, since the setting of the rated current of the power conversion device 10 can be increased, it is possible to connect to the AC motors having various rated currents.

Second Embodiment

This embodiment is a modification of the first embodiment, and in a case where the user determines the specification of the rated current, an example will be described in which, in addition to the change of the rated current, the temperature reduction operation is set or canceled and the drive operation range is expanded. The flow is the same as that of the first embodiment except for the flow of the rating determination unit 117 described with reference to FIG. 3, and thus description other than FIG. 4 corresponding to FIG. 3 will be omitted.

Figure 4:
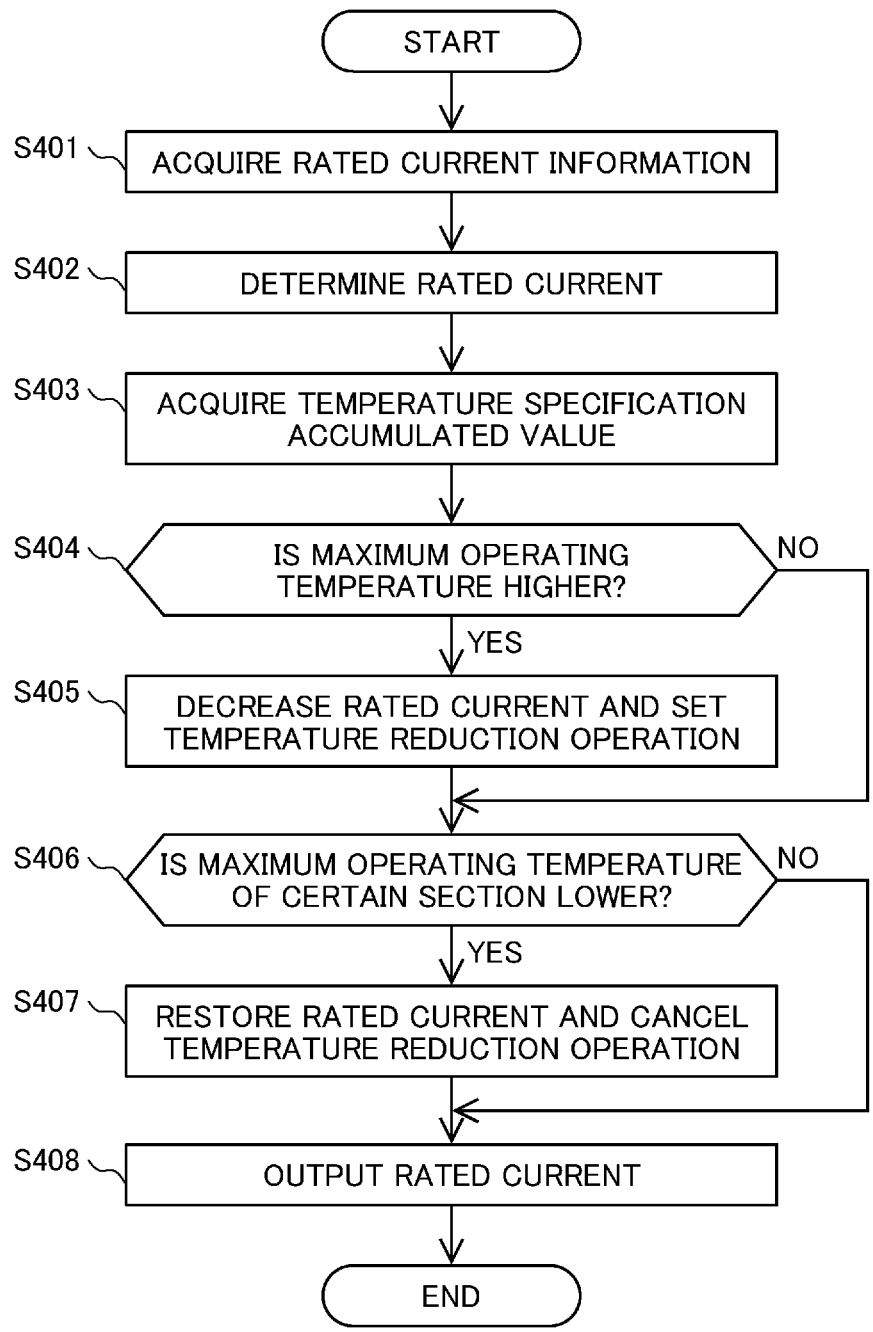
FIG. 4 is a diagram illustrating an example of a flow of a rating determination unit according to a second embodiment.

FIG. 4 is a diagram illustrating an example of a flow in which the rating determination unit 117 determines the rated current from the temperature specification. First, the rating determination unit 117 reads out rated current information from the storage unit 118 (step S401). For example, the rating determination unit 117 may selectively perform whether to acquire a specification value set in advance in the storage unit 118 by the user through the display/operation unit 119 as the rated current information, or whether to acquire a representative value determined in advance at the time of production, if the user does not set the specification value.

In a case where, for example, the rated current value set in advance is 32.0 A, the rating determination unit 117 sets the rated current to 32.0 A or less and outputs the rated current to the overload protection unit 113 (step S402) and obtains "60° C." corresponding to "32.0 A" according to the data of the curve 201 illustrated in FIG. 2A.

The rating determination unit 117 acquires the temperature specification accumulated value information from the storage unit 118 (step S403), and determines whether the maximum operating temperature of the acquired temperature specification accumulated value information is higher than "60° C." (step S404).

In a case where the rating determination unit 117 determines that the maximum operating temperature is high, for example, if the maximum operating temperature has risen to 80° C., the rated current that allows continuous operation is changed to "15.0 A" corresponding to "80° C." in the curve 201 to decrease the protection start current and to set the temperature reduction operation (step S405).

Herein, as the setting of the temperature reduction operation, for example, giving a command to reduce the carrier frequency which is the switching frequency of the IGBT to the control unit 111 through the overload protection unit 113, giving a command to turn off the power supply to the display/operation unit 119, and the like are exemplified.

In addition, the overload protection unit 113 is operating at a rated current of, for example, 15.0 A corresponding to 80° C., and the rating determination unit 117 determines whether the maximum operating temperature in a certain section has been lowered to 60° C. on the basis of the temperature specification accumulated value information acquired in step S403 (step S406).

In a case where the rating determination unit 117 determines that the maximum operating temperature in a certain section has increased only to 60° C., the rated current that allows continuous operation is increased up to "32.0 A" corresponding to "60° C." in the curve 201 to cancel the temperature reduction operation (step S407).

The change of the rated current is not limited to a good value for the break, but the rated current may be changed continuously if the rated current conforms to the curve 201 illustrated in FIG. 2A. The rating determination unit 117 outputs the data of the determined rated current to the storage unit 118 as information to be displayed (step S408).

As described above, in a case where the maximum operating temperature is low, the setting of the rated current of the power conversion device 10 is increased, and thus, the drive region is secured. Even if the maximum operating temperature is increased, the setting of the rated current is decreased, and the temperature reduction operation is executed, so that the protection is not achieved, and the drive region can be secured. In addition, since the setting of the rated current of the power conversion device 10 can be increased, it is possible to connect to AC motors having various rated currents.

In addition, the present invention is not limited to the above-described embodiments, and includes various modifications. For example, the above-described embodiments have been described in detail in order to describe the present invention in an easy-to-understand manner, and are not necessarily limited to those having all the described configurations.

In addition, a portion of the configurations of one embodiment can be replaced with the configurations of another embodiment, and the configurations of another embodiment can be added to the configurations of one embodiment. In addition, for a portion of the configurations of each embodiment, it is possible to add/delete/replace other configurations.

In addition, a portion or all of the above-described configurations, functions, processing units, processing means, and the like may be realized by hardware, for example, by designing an integrated circuit. In addition, the above-described configurations, functions, and the like may be realized by software by a processor interpreting and executing a program for realizing each function.

Information such as programs, tables, and files for realizing each function can be stored in a recording device such as a memory, a hard disk, or a solid state drive (SSD), or a recording medium such as a secure digital (SD) card or a digital versatile disc (DVD).

In addition, control lines and information lines indicate those which are considered necessary for description, and all control lines and information lines on a product are not necessarily indicated. In fact, it may be considered that almost all components are interconnected.

INDUSTRIAL APPLICABILITY

The present invention can be applied to a power conversion device that outputs an AC voltage, and particularly the present invention can be applied to a power conversion device that drives an AC motor.

REFERENCE SIGNS LIST

101 Three-phase AC power supply
102 DC conversion unit
103 Smoothing capacitor
104 AC conversion unit
105 AC motor
106 Current detector
111 Control unit
112 Current detection unit
113 Overload protection unit 114 External communication unit
115 Temperature detection unit
116 Information storage unit
117 Rating determination unit
118 Storage unit
119 Display/operation unit

The invention claimed is:

1. A power conversion device having an AC conversion unit and a control unit that controls the AC conversion unit, comprising:
   a temperature detection unit that outputs temperature data of the power conversion device;
   a current detection unit that outputs current data of an output of the AC conversion unit;
   a storage unit that stores specification data indicating a relationship between a rated current and a temperature specification and the temperature data output by the temperature detection unit;
   an overload protection unit that outputs a shutdown command to the control unit on the basis of the rated current and the current data output by the current detection unit; and
   a rating determination unit that acquires the specification data and the temperature data from the storage unit, determines a rated current corresponding to the acquired temperature data on the basis of the acquired specification data, and outputs the determined rated current to the overload protection unit.

2. The power conversion device according to claim 1, further comprising an input unit that outputs the specification data indicating the relationship between the rated current and the temperature specification to the storage unit in advance.

3. The power conversion device according to claim 2, wherein the input unit outputs the specification data indicating the relationship between the rated current and the temperature specification to the storage unit as a calculation formula.

4. The power conversion device according to claim 2, wherein, as acquisition of the temperature data, determination of the rated current, and outputting of the rated current,
   the rating determination unit acquires the temperature data accumulated in the storage unit from the storage unit as accumulated temperature data,
   if it is determined that a maximum temperature of the acquired accumulated temperature data in a temporally certain section is lower than a temperature set in advance, the rating determination unit determines a rated current corresponding to the maximum temperature determined to be lower on the basis of the acquired specification data, and
   the rating determination unit outputs the determined rated current to the overload protection unit.

5. The power conversion device according to claim 4, wherein, if it is determined that the maximum temperature of the acquired accumulated temperature data is higher than the maximum temperature determined to be lower, the rating determination unit further determines a rated current corresponding to the maximum temperature determined to be higher on the basis of the acquired specification data, and
   the rating determination unit outputs the determined rated current to the overload protection unit.

6. The power conversion device according to claim 5, wherein the input unit
   further outputs overload data indicating a relationship between a rated current ratio and an endurance time to the storage unit in advance,
   wherein the storage unit
   further stores the overload data, and
   wherein the overload protection unit
   acquires the overload data from the storage unit as an output to the control unit,
   calculates the rated current ratio from the rated current output by the rating determination unit and the current data output by the current detection unit,
   determines the endurance time corresponding to the calculated rated current ratio on the basis of the acquired overload data, and
   outputs the shutdown command to the control unit after the determined endurance time has elapsed.

7. The power conversion device according to claim 2, wherein, as acquisition of temperature data, determination of rated current, and outputting of rated current,
   the rating determination unit acquires the temperature data accumulated in the storage unit from the storage unit as accumulated temperature data,
   the rating determination unit sets in advance a temperature corresponding to a current set in advance on the basis of the acquired specification data,
   if it is determined that a maximum temperature of the acquired accumulated temperature data is higher than a temperature set in advance, the rating determination unit determines a rated current corresponding to the maximum temperature determined to be higher on the basis of the acquired specification data, and
   the rating determination unit outputs the determined rated current and settings of a temperature reduction operation to the overload protection unit.

8. The power conversion device according to claim 7, wherein, if the settings of the temperature reduction operation are input from the rating determination unit, the overload protection unit outputs a command to lower a carrier frequency to the control unit.

9. The power conversion device according to claim 8, wherein, if it is determined that the maximum temperature of the acquired accumulated temperature data in a temporally certain section is lower than the maximum temperature determined to be higher, the rating determination unit further determines the rated current corresponding to the maximum temperature determined to be lower on the basis of the acquired specification data, and
   the rating determination unit outputs the determined rated current and cancellation of the temperature reduction operation to the overload protection unit.

10. The power conversion device according to claim 9, wherein the input unit
    further outputs overload data indicating a relationship between a rated current ratio and an endurance time to the storage unit in advance,
    wherein the storage unit
    further stores the overload data, and
    wherein the overload protection unit
    acquires the overload data from the storage unit as an output to the control unit,
    calculates the rated current ratio from the rated current output by the rating determination unit and the current data output by the current detection unit, determines the endurance time corresponding to the calculated rated current ratio on the basis of the acquired overload data, and outputs the shutdown command to the control unit after the determined endurance time has elapsed.

* * * * *